US011172685B2

(12) United States Patent
Cammarota et al.

(10) Patent No.: US 11,172,685 B2
(45) Date of Patent: Nov. 16, 2021

(54) GLUTEN-FREE TORTILLAS

(71) Applicant: General Mills, Inc., Minneapolis, MN (US)

(72) Inventors: Carina Claudia Cammarota, Navarra (ES); Christine S.t. Ng, Minneapolis, MN (US); Jonas Plaza Garcia, La Rioja (ES)

(73) Assignee: General Mills, Inc., Minneapolis, MN (US)

(*) Notice: Subject to any disclaimer, the term of this patent is extended or adjusted under 35 U.S.C. 154(b) by 764 days.

(21) Appl. No.: 15/419,474

(22) Filed: Jan. 30, 2017

(65) Prior Publication Data
US 2018/0213804 A1 Aug. 2, 2018

(51) Int. Cl.
A21D 13/066 (2017.01)
A21D 2/00 (2006.01)
A21D 6/00 (2006.01)
A21D 13/42 (2017.01)
A21D 13/047 (2017.01)
A21D 8/04 (2006.01)

(52) U.S. Cl.
CPC ............ A21D 13/066 (2013.01); A21D 2/00 (2013.01); A21D 6/00 (2013.01); A21D 8/042 (2013.01); A21D 13/047 (2017.01); A21D 13/42 (2017.01)

(58) Field of Classification Search
CPC ........... A21D 13/066; A21D 2/00; A21D 6/00
See application file for complete search history.

(56) References Cited

U.S. PATENT DOCUMENTS

| | | |
|---|---|---|
| 3,653,337 A | 4/1972 | Hanson |
| 4,911,943 A | 3/1990 | Slimak |
| 5,789,012 A | 8/1998 | Slimak |
| 2007/0269579 A1 | 11/2007 | Mingus et al. |
| 2010/0015279 A1 | 1/2010 | Zhang et al. |
| 2010/0184963 A1 | 7/2010 | Scanlin et al. |
| 2010/0196569 A1 | 8/2010 | Scanlin et al. |
| 2012/0021113 A1 | 1/2012 | Villagran et al. |
| 2013/0040016 A1 | 2/2013 | Becker |
| 2014/0072673 A1 | 3/2014 | Loghmani |
| 2014/0377424 A1 * | 12/2014 | Griebel .................. A21D 8/06 426/392 |
| 2016/0073665 A1 | 3/2016 | Mohindru |

FOREIGN PATENT DOCUMENTS

| | | | |
|---|---|---|---|
| KR | 20130095547 | 8/2013 | |
| WO | WO 2015169778 A1 * | 11/2015 | ............. A21D 2/183 |
| WO | WO 2016/099554 | 6/2016 | |

OTHER PUBLICATIONS

"Homemade GF Flatbread or Tortilla Recipe" Mar. 13, 2014 http://web.archive.org/web/20140313052314/http://www.savvyvegetarian.com/vegetarian-recipes/gf-flat-bread-tortilla.php.*
"Fat-Free Gluten-Free Tortillas" Sep. 8, 2014 http://www.feastingonfruit.com/fat-free-gluten-free-tortillas/.*
"Gluten Free Quinoa Tortillas" Web archive date Sep. 20, 2012. https://web.archive.org/web/20140920212740/http://www.the36thavenue.com/gluten-free-quinoa-tortillas/ (Year: 2012).*
Hillson, Beth. "How to Make a Gluten-Free Flour Blend" Web Archive date Sep. 30, 2012. https://web.archive.org/web/20120930091140/http://theheritagecook.com/gluten-free-3/flour-power-building-a-flour-blend/ (Year: 2012).*
"Food Volume to Weight Conversions, Salt" Retrieved Dec. 15, 2017. https://www.aqua-calc.com/calculate/food-volume-to-weight (Year: 2017).*
"Density of Cooking Oil." The Physics Factbook. 2000 http://hypertextbook.com/facts/2000/IngaDorfman.shtml (Year: 2000).*
"Ingredient Weight Chart" King Arthur Flour. Retrieved Dec. 15, 2017. https://www.kingarthurflour.com/learn/ingredient-weight-chart.html (Year: 2017).*
Sanitary Tortilla, http://www.sanitarytortillacompany.com/directions.html (retrieved Nov. 1, 2016).
Huarache (food), https://en.wikipedia.org/wiki/Huarache_(food) (retrieved Nov. 1, 2016).
Tlacoyo, https://en.wikipedia.org/wiki/Tlacoyo (retrieved Nov. 1, 2016).
Corn Tortillas, http://www.landesfood.com/corn-tortillas (retrieved Nov. 1, 2016).
Quinoa Tortillas, http://www.bobsredmill.com/recipes/how-to-make/quinoa-tortillas (retrieved Nov. 1, 2016).
Gluten Free Quinoa Tortillas, http://www.the36thavenue.com/gluten-free-quinoa-tortillas (retrieved Nov. 1, 2016).
Quinoa Tortillas, https://www.simplyquinoa.com/quinoa-tortillas (retrieved Mar. 6, 2018).
3-Ingredient Gluten-Free Oat Wraps, http://naturalchow.com/2014/03/3-ingredient-gluten-free-oat-wraps (retrieved Mar. 6, 2018).
How to Build a Gluten Free Flour Blend from Scratch—The Heritage Cook, http://theheritagecook.com/gluten-free-3/flour-power-building-a-flour-blend (retrieved Mar. 6, 2018).

* cited by examiner

Primary Examiner — Katherine D Leblanc
(74) Attorney, Agent, or Firm — Diederiks & Whitelaw, PLC; John L. Crimmins, Esq.

(57) ABSTRACT

Gluten-free tortillas are made from a composition including a gluten-free flour mixture constituting from 50-60% of weight of the composition, with the gluten-free flour mixture consisting of a combination of rice or tapioca flour, oat flour and *quinoa* flour. In particular embodiments, the flour mixture includes substantially equal amounts of the rice or tapioca flour, oat flour and *quinoa* flour by weight of the composition. In addition, the composition includes an enzyme for structural integrity purposes. In embodiments utilizing rice flour in the tri-flour blend, the composition can also comprises about 8% by weight of tapioca starch. Further, the gluten-free tortilla may be soft flat tortilla or a soft shaped tortilla having a formed shape selected from a cup, bowl, U- or square bottomed shaped taco shell, boat, tube, envelope or cone.

19 Claims, No Drawings

GLUTEN-FREE TORTILLAS

BACKGROUND OF THE INVENTION

Consumers are searching for healthy and yet convenient food options, with an increasing number of individuals also avoiding gluten due to gluten sensitivities or intolerance to gluten. Gluten is a protein found in a variety of grains including wheat, rye and barley, with wheat containing the highest levels of gluten when compared to other cereal grains.

Gluten is responsible for the texture and taste of wheat flour-based baked goods, such as tortillas, cookies, brownies and breads. Upon hydration, gluten forms a network of fine strands that give the dough structure and the capacity to stretch and/or rise during baking. The elasticity of gluten enables the dough to trap gases, which create open cellular structures upon baking.

Recently there has been a growing trend to provide gluten-free goods, such as tortillas. While consumers are demanding gluten-free products, it is very difficult to produce gluten-free products having a similar taste and texture as traditional gluten and/or wheat flour containing products because, as described above, gluten provides the structure or framework for traditional baked goods. When wheat flour is replaced with a gluten-free flour, such as rice flour, the dough lacks a matrix to create the structure and texture typically associated with comparable gluten containing baked goods. For example, gluten-free dough may not have the same elasticity as a gluten dough, and may be drier and more difficult to handle.

In particular, tortillas are desirably shelf stable, highly soft and flexible, and can fold and bend without breaking. The term "tortilla" is used herein to refer to a Mexican style tortilla, i.e., a generally flat unleavened cooked flexible pan baked dough product which is generally circular in shape. Tortillas are typically made from a corn masa dough ("tortilla de maiz") or from a wheat dough ("tortilla de harina"). The two versions of the Mexican tortilla have different textures owing to the grains from which they originate. The maize version is somewhat thicker and heartier in texture, while the wheat version is less easily broken, due to its elevated gluten content.

Consumers desiring a gluten-free tortilla are most often limited to corn tortillas, which are not as flexible or easy to handle. Soft shaped tortilla products, such as those described in U.S. 2010/0272863, also provide options for consumers for a tortilla that is easy to use and less messy. However, such soft shaped tortillas must be flexible and durable enough to withstand shaping, which is difficult to accomplish in gluten free products.

Thus, there is a need in the art for a gluten-free, soft shaped tortilla product that is easy to use, less messy, delicious to eat and healthier than other options. Also, there is a need in the art for methods for manufacturing and using such a product.

SUMMARY OF THE INVENTION

The present invention relates to gluten-free tortillas and methods of making the tortillas. In one embodiment, the tortillas are formed from a composition including a gluten-free flour mixture constituting from 50-60% of weight of the composition, with the gluten-free flour mixture consisting of a combination of three different flours, with the first flour being either rice flour or tapioca flour, the second flour being oat flour and the third flour being *quinoa* flour. The composition also includes at least 30% water by weight of the composition, and an enzyme, such as in an amount of about 0.27%, for structural integrity purposes. In particular, in one preferred embodiment, the flour mixture includes 17-20% rice or tapioca flour, 17% to 20% oat flour, and 17% to 20% *quinoa* flour by weight of the composition. When rice flour is employed, the composition can also comprise about 8% by weight of tapioca starch. The gluten-free tortilla may be a soft, flat tortilla or a soft shaped tortilla having a formed shape selected from a cup, bowl, U- or square bottomed shaped taco shell, boat, tube, envelope or cone.

While multiple embodiments are disclosed, still other embodiments of the present invention will become apparent to those skilled in the art from the following detailed description, which shows and describes exemplary embodiments of the invention.

DETAILED DESCRIPTION OF THE INVENTION

Wheat flour tortillas have high toughness, extensibility and rollability due to the wheat gluten contained in the wheat flour. Corn masa tortillas, while gluten-free, have a much lower toughness, extensibility and rollability. It has been surprisingly found that tortillas formed from a blend of oat flour, rice or tapioca flour and *quinoa* flour have a texture much more similar to wheat flour tortillas than other gluten-free tortillas, such as corn masa tortillas. Prior art gluten free tortillas tend to not have enough hydration, not be thoroughly mixed, and the starch and protein are more separated. Thus, the texture is not cohesive and the tortillas seem crumbly. In comparison, with the gluten-free tortillas of the present invention, the dough is thoroughly mixed, the starch holds the matrix together, and the available protein is well distributed.

The current invention relates to gluten-free tortilla formulations and soft shaped gluten-free tortillas. Broadly, in one aspect, the present invention comprises a soft, shaped gluten-free tortilla in a variety of specific three dimensional shapes or configurations. Traditionally, in northern Mexico, tortillas are cooked unleavened flexible flat breads typically in thin or flat, circular or elliptical shape useful as an edible bread wrap for small quantities of other foods such as meat pieces, rice and/or vegetables mixture. Throughout the specification and claims, percentages are by weight and temperatures in degrees Centigrade unless otherwise indicated.

As used herein, a "soft shaped tortilla" or, equivalently, a "shaped soft tortilla" means a fully cooked but non-fried tortilla farinaceous dough product that is formed into a thin walled three-dimensional shape of sufficient rigidity to hold its shape at room temperature. Thus, "tortilla" means a fully cooked product. By comparison, "tortilla dough" means uncooked or partly cooked product. "Fully cooked" is understood to be a product that reaches about 85° C. (+/−2 degrees), and is evidenced by substantially all of the starch being gelatinized.

The final moisture content of the soft shaped tortilla is less than about 28% (≤28%), preferably ≤25%. In preferred form, the gluten-free tortillas are shelf stable and exhibit a water activity value ("$A_w$") of ≤0.88. In less preferred variations, the soft shaped tortilla pieces are suitable only for refrigerated distribution and sale and exhibit an $A_w$ of ≤0.92.

The particular ingredients and concentration provide finished gluten-free tortilla products having a water activity ("Aw") of 0.88 or less and for best results less than 0.85 to about 0.7. Selection of such water activity value is important in achieving a balance between microbial shelf stability and dough handling characteristics. Water activity can also be reduced by using polyols, such as glycerol and sorbitol. Good results are obtained when the moisture content of the finished product ranges from about 10% to about 25%, preferably 15% to 20%.

The invention further encompasses a method of making a gluten-free tortilla product. In one particular aspect, the invention disclosure encompasses a soft shaped, gluten free tortilla that is hot formed to hold the shape of a cup or bowl, e.g., a salad bowl. In other aspects, the tortilla can be formed to rigidly hold the shape of a taco (i.e., U-shaped taco shell) or the shape of a boat/canoe. In still other aspects, the tortilla can be formed to hold the shape of a pita, flower bud, pie, tube, envelope, pod, bun, or cone. The formed shape can have a flat bottom and sealed sides.

In accordance with the invention, the gluten free tortilla articles can be provided in a variety of sizes from jumbo burrito size to mini chalupa size. A "chalupa" (Spanish for "boat" or "launch") is a tortilla dough formed into a shape reminiscent of a small boat. As starting material, it is possible to use round precooked tortillas or rounded flatted tortilla dough that is about 76 mm, about 102 mm, about 127 mm, about 152 mm, about 178 mm, about 191 mm, about 203 mm, about 229 mm, about 254 mm, or up to about 305 mm, or more, in diameter. For example, a 190 mm diameter precooked tortilla or flattened tortilla dough can be used to give cup dimensions of about 89 mm diameter and about 51 mm height. It is also possible to use precooked tortillas or flattened, pre-cut pieces of dough that are cut to easily fit into a mold for shaping. The starting material can be any shape suitable for the final mold, for example, round, oval, crescent, square, rectangular, trapezoid, triangular, etc.

Regardless of specific shape, a feature of the present soft shaped tortilla articles is a thin walled construction characteristic of a tortilla. Good results are obtained in terms of sufficient rigidity as to maintain the desired structure while nonetheless providing a soft eating quality characteristic of wheat tortillas, and when the present articles are fabricated with wall thicknesses ranges from about 1-5 mm, preferably about 24 mm. For example, in one specific embodiment, the thickness of the soft shaped tortilla can be about 1.3 mm, about 2.3 mm, about 3.3 mm, or about 3.8 mm.

In another variation, the shaped tortilla of the present invention can be made using a standard tortilla having a thickness less than 1.5 mm or a thickness greater than or equal to 1.5 mm. As mentioned above, range on thickness could be 0.5-5 mm. Consequently, in one aspect, the shaped tortilla can be made from a standard tortilla having a thickness of about 1.5 to about 3.0 mm, or greater. In one aspect, then, the shaped tortilla can be made with a standard tortilla thickness of about 1 to about 2.0 mm, or greater.

In most embodiments of the present invention, the dough is formed from a composition including a gluten-free flour mixture present in an amount of 50-60% of weight of the composition. The gluten-free flour mixture consists only of rice or tapioca flour, oat flour and *quinoa* flour. In preferred embodiments, the composition includes rice or tapioca flour in an amount of 17% to 20% by weight of the composition, oat flour in an amount from 17% to 20% by weight of the composition, and *quinoa* flour in an amount from 17% to 20% by weight of the composition. The composition also includes water in an amount of at least 30%, preferably 30% to 36% and most preferably about 33%, by weight of the composition and an enzyme, preferably in an amount of about 0.27% of the composition. The composition also includes 1% to 2% of at least one hydrocolloid by weight of the composition, such as xanthan gum. The dough can additionally include about 0.1% to about 4% salt, preferably about 0.5% to 3% salt or 1% to 2% of at least one salt by weight of the composition. In embodiments which employ rice flour, the composition can also comprise about 8% by weight of tapioca starch. In the embodiments employing tapioca flour, the percentage of tapioca flour can greatly increase, even double or more, with a corresponding reduction in *quinoa* and/or oat flour, such as 5-15%. In any case, the present dough composition, in highly preferred embodiments, is free of edible fat or shortening ingredients.

Gluten-free tortillas according to embodiments of the present invention contain less than 20 ppm gluten, preferably less than 10 ppm gluten and, more particularly, 0% by weight of gluten. For purposes of the invention, gluten content may be determined by the gliadin content. The gluten-free flour mixture is a substitute for wheat flour and/or other gluten containing flours traditionally used in tortillas. The combination of several ingredients contained in the gluten-free dough described herein provides a gluten-free tortilla having taste, texture and rheology similar to that of gluten containing doughs, and provides gluten-free tortillas having flexibility and strength comparable to gluten containing tortillas.

Rice, tapioca oat and *quinoa* flours do not contain gluten, gliadin or glutenin. Suitable forms of rice flour include short grain and long grain white and brown rice. The dough may include about 17-20% by weight of rice or tapioca flour, and more particularly about 17% by weight. Similar, the dough may include about 17-20% by weight of *quinoa* flour, and more particularly about 17% by weight. Oat flour is also included in an amount of about 17-20% by weight of oat flour, and more particularly about 17% by weight of oat flour.

At least when utilizing rice flour, the gluten-free flour mixture may further include tapioca starch. In some embodiments, the tapioca starch may be native or unmodified starches. In other embodiments, the tapioca starch may be modified starches. Modified starches can be prepared by physically, enzymatically or chemically treating the native starch to change the properties of the starch. The inclusion of tapioca starch into the gluten-free tortilla dough can particularly provide a dough texture similar to wheat based dough without creating off-flavors. To maintain a desired moisture level and spread characteristics, the gluten-free tortilla dough made with rice, oat and *quinoa* flours may include about 8% by weight of tapioca starch.

In each case, the composition can further comprise about 2% to about 15% of a humectant on a dry weight basis, preferably about 4% to about 8%. Humectant addition is helpful in achieving the present water activity levels and the microbial shelf stability at room temperature provided by the present food products. The humectant can be any commonly employed humectant ingredient(s). Preferred humectants for use herein are selected from the group consisting of glycerin/glycerol, mannitol, propylene glycol, sorbitol, xylitol and mixtures thereof. Preferred for use herein is glycerin by itself or a mixture of sorbitol and glycerin.

The dough also preferably includes an enzyme to induce dough annealing. Annealing is a physical treatment that modifies the chemical and physical properties of starch without destroying granular structure. Thus, the original order and structure of the starch granules is advantageously maintained. In one preferred embodiment, the enzyme is α-amylase and it is present in an amount of about 0.27% by weight of the composition.

The formulations for the dough from which the present gluten-free tortillas are fabricated can additionally include one or more emulsifiers. Specifically, the present formulations can further comprise about 0.2% to about 1.5% of an emulsifier on a dry weight basis, preferably about 0.4% to about 0.8%. Emulsifiers, which strengthen the dough, give improved mixing and handling tolerance, increase loaf volume, improve mechanical slicing characteristics, and can retard staling. Emulsifiers typically are surface active agents that stabilize mixtures of hydrophobic and hydrophilic substances by lowering the interfacial tension between usually immiscible substances. Emulsifying agents which can be used include mono- and diglycerides of fatty acids, propylene glycol mono-diesters of fatty acids, glycerol-lactose esters of fatty acids, ethoxylated or succinylated mono- and diglycerides, lecithin, diacetyl tartaric acid esters or mono-diglycerides, sucrose esters of glycerol, or equivalents thereof and mixtures thereof. Preferred emulsifiers include mixtures of diacetyl tartaric acid esters, and succinylated mono- and diglycerides. Emulsifying agents can be used singly or in combination with usage levels of less than 3% by weight. In a preferred embodiment, the emulsifier is mono-diglyceride in an amount of 0.88% by weight.

The doughs of the present invention are prepared by blending the dry ingredients, such as the gluten-free flour blend, optionally tapioca starch, salt, and enzyme. The dry ingredients are mixed at a low speed for about two minutes. The liquid ingredients are then added, such as water and glycerol. The liquid and dry ingredients are then mixed in a mixing device at a low speed followed by a high speed. In a preferred embodiment, the mixture is mixed at a low speed for 4 minutes, followed by mixing at a high speed for 10 minutes to fully develop the dough and establish the proper rheology.

The dough is provided in small measured quantities useful herein for making the present sized and shaped pieces. In the preparation of smaller base pieces, these quantities can range from about 5-25 g each. For larger soft shaped tortilla base pieces, a larger quantity (e.g., 40-60 g) can be used. Various techniques or apparatuses can be used to provide such measured quantities of dough. For example, the dough can be formed into a continuous shape such as a rope, sheet or ribbon and the continuous strand sectioned (such as by a reciprocating guillotine knife) into desired uniform (±10%) quantities, e.g., if a 10 g quantity is desired, then each quantity will be 10 g 1 g. In small scale commercial production, simple manual cutting the dough into such small quantities can be performed.

The gluten-free tortilla can be formed by standard tortilla processing methods, such as sheeting, lamination, ball & press methods. In preferred embodiments, the gluten-free tortillas are formed using a lamination process in which the dough is mixed, laminated, and cut. The cut pieces are then passed through an oven and cooling station. In the sheeting method, the dough is mixed, sheeted and cut, followed by passing through an oven and cooling station. In the ball and press method, the dough is mixed, divided/rounded and allowed to rest prior to being pressed. The pieces are then passed through an oven and cooling station. In embodiments where the dough is allowed to rest, good results are obtained when the measured quantities of dough, e.g., dough balls, are allowed to rest for 5-10 minutes at ambient temperatures. A resting step is useful for better facility of the dough conforming to the shape of the dough without thickness variations or weak spots in the finished pieces.

The invention also encompasses a method of making a soft gluten-free tortilla which is formed into a shape. The method can comprise putting raw tortilla dough in a mold and cooking it to completion to set the shape. Alternatively, the method can comprise heating raw tortilla dough in a mold to set the tortilla shape without fully cooking it. The shaped dough is then heated in a further step to fully cook it, so as to cause the structure to become firm, and to lower the moisture level.

As another alternative, the method can comprise preheating flattened tortilla dough, further heating the flattened dough in a mold to set the shape, and still further heating the molded dough to fully cook it and to reduce the moisture content. In a further alternative, the method can comprise heating a flat precooked and preheated tortilla; wrapping the heated, flat precooked and preheated tortilla around a mold to form a shape; and allowing the warm, shaped soft tortilla product to cool in a manner that retains the shape and reduces the moisture content.

Baking is preferred in heating the gluten-free tortillas to reduce the moisture content, including baking by conventional ovens, convection ovens, rotary rack ovens, brick ovens, infra-red ovens, tortilla ovens, and toaster ovens. Preferably, the gluten-free tortillas are heated to retain softness while avoiding a tough, chewy or soggy texture. In various aspects, the moisture content of the final product can be in a range from about 23% to about 28%, or specifically, about 24%, about 25%, or about 26%. In particular aspects, the water activity of the final product can be in a range of about 0.82 to about 0.92, or less than or equal to 0.88.

The examples described herein are for purposes of illustrating embodiments of the invention. Other embodiments, methods, and types of analyses are within the scope of persons of ordinary skill in the art and need not be described in detail hereon. Other embodiments within the scope of the art are considered to be part of this invention. Two exemplary formulas for gluten-free tortillas are shown in Table 1. At this point, it should be noted that the composition lacks the inclusion of any fat such as shortening or oil, any preservative and even a leavener.

TABLE 1

| INGREDIENTS | GLUTEN FREE TORTILLAS FORMULA 1 | GLUTEN FREE TORTILLAS FORMULA 2 |
| --- | --- | --- |
| Water | 33.55% | 33.32% |
| Oat Flour | 19.68% | 17.18% |
| Rice Flour | 19.68% | 17.18% |
| Quinoa Flour | 19.68% | 17.18% |
| Tapioca Starch | | 7.73% |
| Salt | 1.42% | 1.43% |
| Mono-Diglycerides | 0.88% | 0.88% |
| Glycerol | 3.29% | 3.3% |
| Xanthan Gum | 1.54% | 1.55% |
| α-Amylase | 0.27% | 0.27% |
| | 100.00% | 100.00% |

A gluten free tortilla of present invention was prepared by mixing the dry ingredients of Formula 1 as shown in Table 1. The oat, rice and tapioca flours, salt, mono-diglycerides, hydrocolloid and α-amylase were mixed at a low speed for 2 minutes. The liquid ingredients were then added, i.e. the water and glycerol, and mixed with the dry ingredients at a low speed for 4 additional minutes, followed by mixing at a high speed for 10 minutes. The dough was then sheeted and cut into pieces. The pieces were then baked in a tortilla oven about @ approx. 554° F. (about 290° C.) for 30-90 seconds and cooled for five minutes on a cooling rack.

The formula 1 tortillas (Control) were then compared to tortillas prepared using corn masa dough and wheat flour dough. Tortillas using different mixing times, oil and lacking enzymes were also analyzed and compared to the Control tortilla. As shown in Table 2, the toughness and extensibility of the present gluten-free tortillas is advantageously more similar to that of wheat flour tortillas than the toughness and extensibility of corn masa tortillas. For purposes of this disclosure, toughness refers to resistance to extension. It is measured in grams and is related with the maximum strength registered. Toughness measurement gives information about the tortilla resistance, such as how the tortilla would resist loading or filling without breaking. Extensibility is a measure of the distance for the tortilla to break. In particular, the extensibility measurement gives information about the tortilla elasticity, i.e., deformation of the tortilla without breaking.

TABLE 2

|  |  | GF Tri Grain Low mixing Time (2-4-4) | GF Tri Grain Medium mixing Time (2-4-10) | GF Tri Grain High mixing Time (2-4-16) | GF Tri Grain No Enzymes (Sheeting & Cutting) | GF Tri Grain With Sunflower Oil (3%) | Corn Masa Dough | Wheat Flour Dough |
|---|---|---|---|---|---|---|---|---|
|  |  |  |  | Tortillas |  |  |  |  |
|  |  | Low Mix | Control Mix | High Mix | No Enzymes | Oil | Corn | Wheat |
| Day 0 |  |  |  |  |  |  |  |  |
| Rollability |  | 6 | 6 | 6 | 6 | 6 | 6 | 6 |
| Toughness | g | 417.20 | 475.03 | 312.48 | 461.82 | 417.83 | 275.21 | 720.35 |
| Extensibility | mm | 14.69 | 16.04 | 14.32 | 15.7 | 14.24 | 10.19 | 24.85 |
| Day 30 |  |  |  |  |  |  |  |  |
| Rollability |  | 4 | 3 | 3 | 1 | 2 | 6 | 6 |
| Toughness | g | 228.85 | 237.22 | 212.44 | 279.56 | 322.91 | 157.25 | 674.87 |
| Extensibility | Mm | 10.77 | 10.79 | 10.33 | 7.78 | 10.01 | 8.6 | 21.69 |

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The invention claimed is:

1. A gluten-free tortilla composition comprising:
   gluten-free flour mixture from 50-60% of weight of the composition, said gluten-free flour mixture being a combination of only three flours consisting of: rice or tapioca flour, oat flour and *quinoa* flour; and
   water in an amount of at least 30% by weight of the composition, wherein the composition is free of gluten protein, a fat, and a leavener.
2. The composition of claim 1, further comprising from 1% to 2% of at least one hydrocolloid by weight of the composition.
3. The composition of claim 2, wherein the hydrocolloid includes xanthan gum.
4. The composition of claim 1, further comprising from 1% to 2% of at least one salt by weight of the composition.
5. The composition of claim 1, wherein the *quinoa* flour is present in an amount from 17% to 20% by weight of the composition.
6. The composition of claim 5, wherein the oat flour is present in an amount from 17% to 20% by weight of the composition.
7. The composition of claim 6, wherein rice flour is employed, with the rice flour being present in an amount from 17% to 20% by weight of the composition.
8. The composition of claim 7, wherein the composition further comprises about 8% by weight of tapioca starch.
9. The gluten-free tortilla of claim 1, wherein the gluten-free tortilla is a soft shaped tortilla having a formed shape selected from a cup, bowl, U- or square bottomed shaped taco shell, boat, tube, envelope or cone.
10. The gluten-free tortilla of claim 9, wherein the soft shaped tortilla is sufficiently cooked to maintain the formed shape at room temperature.
11. A method of preparing gluten free tortillas, comprising the steps of:
   A. providing and mixing, at a low speed, a dry composition including gluten-free flour mixture from 50-60% by weight of the composition, said gluten-free flour mixture being a combination of only three flours consisting of: rice or tapioca flour, oat flour and *quinoa* flour, along with an enzyme to induce annealing, wherein the composition is free of gluten protein, a fat, and a leavener;
   B. adding liquid ingredients to the dry composition to form a dough mixture and mixing at a low speed, said liquid ingredients including water in an amount of at least 30% by weight and the gluten-free flour mixture being from 50-60% by weight of the dough;
   C. mixing the dough mixture at a high speed;
   D. forming the dough into quantities of individual tortilla pieces having a thickness of about 1-5 mm; and
   E. baking the tortilla pieces to form finished gluten free-tortillas.
12. The method of claim 11, wherein the dry composition further includes from 1% to 2% of at least one hydrocolloid by weight of the composition.
13. The method of claim 11, wherein the *quinoa* flour is present in an amount from 17% to 20% by weight of the composition.
14. The method of claim 13, wherein the oat flour is present in an amount from 17% to 20% by weight of the composition.
15. The method of claim 14, wherein the composition includes rice flour, with the rice flour being present in an amount from 17% to 20% by weight of the composition.
16. The method of claim 15, further comprising: adding about 8% by weight of tapioca starch.

17. The method of claim 11, wherein the forming step includes shaping the tortilla pieces into a shape selected from a cup, bowl, U- or square bottomed shaped taco shell, boat, tube, envelope or cone.

18. The method of claim 11, wherein the soft shaped tortilla is sufficiently cooked to maintain the formed shape at room temperature.

19. A gluten-free tortilla composition comprising:
- gluten-free flour mixture from 50-60% of weight of the composition, said gluten-free flour mixture being a combination of three flours selected from the group consisting of: rice or tapioca flour, oat flour, and *quinoa* flour; and
- water in an amount of at least 30% by weight of the composition, wherein the composition is free of gluten protein, a fat, and a leavener.

\* \* \* \* \*